(12) United States Patent
Sherman

(10) Patent No.: US 10,487,974 B2
(45) Date of Patent: Nov. 26, 2019

(54) ADJUSTABLE SUPPORT ARM ASSEMBLY

(71) Applicant: Knape & Vogt Manufacturing Company, Grand Rapids, MI (US)

(72) Inventor: John D. Sherman, Guelph (CA)

(73) Assignee: Knape & Vogt Manufacturing Company, Grand Rapids, MI (US)

( * ) Notice: Subject to any disclaimer, the term of this patent is extended or adjusted under 35 U.S.C. 154(b) by 48 days.

(21) Appl. No.: 15/695,512

(22) Filed: Sep. 5, 2017

(65) Prior Publication Data

US 2019/0072229 A1    Mar. 7, 2019

(51) Int. Cl.

| | |
|---|---|
| *F16M 13/00* | (2006.01) |
| *F16M 11/04* | (2006.01) |
| *F16M 11/10* | (2006.01) |
| *F16M 11/20* | (2006.01) |
| *F16M 11/24* | (2006.01) |
| *F16M 13/02* | (2006.01) |
| *F16M 11/16* | (2006.01) |

(52) U.S. Cl.
CPC ............. *F16M 11/16* (2013.01); *F16M 11/10* (2013.01); *F16M 11/2085* (2013.01); *F16M 13/022* (2013.01); *F16M 2200/04* (2013.01); *F16M 2200/06* (2013.01)

(58) Field of Classification Search
CPC .... F16M 11/16; F16M 11/10; F16M 11/2085; F16M 2200/04; F16M 2200/06; F16M 11/041; F16M 11/046; F16M 13/022
See application file for complete search history.

(56) References Cited

U.S. PATENT DOCUMENTS

| | | | | |
|---|---|---|---|---|
| 3,820,752 A | * | 6/1974 | Oram ................... | F16M 11/046 248/284.1 |
| D302,866 S | * | 8/1989 | De Lucchi ............. | F21S 6/002 D26/65 |
| 5,016,153 A | * | 5/1991 | Gismondi .............. | F16M 11/10 362/287 |
| D326,535 S | * | 5/1992 | Hsia ............................... | D26/65 |
| 5,339,233 A | * | 8/1994 | Yang ...................... | F16M 11/10 362/345 |
| 5,538,214 A | | 7/1996 | Sinila | |
| 5,609,316 A | * | 3/1997 | Tigliev ................... | A61B 90/25 248/123.11 |
| 5,779,209 A | | 7/1998 | Rello | |
| 5,826,846 A | | 10/1998 | Buccieri et al. | |
| D448,879 S | * | 10/2001 | Wang ............................. | D26/65 |

(Continued)

Primary Examiner — Tan Le
(74) Attorney, Agent, or Firm — Cook Alex Ltd.

(57) ABSTRACT

An adjustable support arm assembly including a base, a lower arm having a first end connected to the base, an upper arm having a pivotal connection to a second end of the lower arm disposed between first and second ends of the upper arm and a plurality of adjustment positions disposed between the pivotal connection to the lower arm and the first end of the upper arm, a counterbalance unit connected to the lower arm or the upper arm and including a movable portion, an elongated flexible element having a first end connected to the movable portion of the counterbalance unit and the elongated flexible element extends from the lower or upper arm to which the counterbalance unit is connected and a second end of the elongated flexible element is connected to the other of the lower or upper arm to which the counterbalance unit is not connected.

27 Claims, 9 Drawing Sheets

(56) References Cited

U.S. PATENT DOCUMENTS

| | | | |
|---|---|---|---|
| 6,857,610 B1 | 2/2005 | Conner et al. | |
| 7,097,145 B2 | 8/2006 | Turner | |
| 7,478,786 B2 | 1/2009 | Copeland | |
| 8,720,838 B2 | 5/2014 | Bowman et al. | |
| 8,777,172 B2 | 7/2014 | Sapper et al. | |
| 8,794,579 B2 | 8/2014 | Sturman et al. | |
| 8,931,748 B2 | 1/2015 | Bowman et al. | |
| 9,027,894 B2 | 5/2015 | Sapper et al. | |
| 9,033,292 B2 | 5/2015 | Lu | |
| 9,197,041 B2 * | 11/2015 | Wabnegger | H02G 1/04 |
| 9,228,696 B2 | 1/2016 | Borloz et al. | |
| 9,277,812 B2 | 3/2016 | Bennett et al. | |
| 9,339,247 B2 | 5/2016 | Jarva | |
| 9,470,357 B2 | 10/2016 | Hazzard et al. | |
| 9,568,147 B2 | 2/2017 | Borloz et al. | |
| 9,581,285 B2 | 2/2017 | Ergun et al. | |
| 10,024,484 B2 * | 7/2018 | Brown | F16M 11/041 |
| 2016/0109058 A1 | 4/2016 | Bennett et al. | |

\* cited by examiner

ADJUSTABLE SUPPORT ARM ASSEMBLY

BACKGROUND

Field of the Invention

The present invention relates to a support apparatus and more particularly to an adjustable support arm assembly, such as may be used to adjustably support a display device or other apparatus at variable heights.

Discussion of the Prior Art

Prior art support apparatus for electronic displays or monitors, lamps or other electronic apparatus have various configurations. Some are fixed in a given position, while others may be adjusted. It also is common to have a base assembly that includes a clamp mechanism by which the support apparatus may be secured to a work surface, such as a desk top or table top, so as to avoid tipping. Of those that are height adjustable, some have a preset counterbalance that is selected to correspond to the mass of a given electronic device that will be supported at an end of a support arm. Others have a means of adjusting a counterbalance, often by use of tools, so as to accommodate electronic devices having different masses while being able to provide more fluid motion when adjusting the support arm.

SUMMARY

The purpose and advantages of the present invention will be set forth in and apparent from the description and drawings that follow, as well as will be learned by practice of the claimed subject matter. The present disclosure provides an adjustable support arm assembly that advantageously permits convenient, quick and intuitive height and counterbalance adjustment, without the use of tools. The base of the assembly need not be clamped to a work surface, and it is very simple to reposition the free-standing support arm assembly with respect to turning it toward or away from a user. The adjustable support arm assembly also may be used to support various devices having different features and masses, and may include a mounting head that permits tilting, rotation or other angular positioning of a supported device. Indeed, there may be many uses for the adjustable support arm assembly, such as for supporting a display or monitor, a lamp or other device.

In one aspect, the present disclosure provides an adjustable support arm assembly that includes a base, a lower arm having a first end and an opposed second end, wherein the first end of the lower arm is connected to the base. An upper arm has a first end, an opposed second end, a pivotal connection to the second end of the lower arm disposed between the first and second ends of the upper arm, and a plurality of adjustment positions disposed between the pivotal connection to the second end of the lower arm and the first end of the upper arm. The adjustable support arm assembly also has a counterbalance unit connected to the lower arm or the upper arm and including a movable portion, and an elongated flexible element having a first end and an opposed second end, wherein the first end of the elongated flexible element is connected to the movable portion of the counterbalance unit and the elongated flexible element extends from the lower or upper arm to which the counterbalance unit is connected and the second end of the elongated flexible element is connected to the other of the lower or upper arm to which the counterbalance unit is not connected.

In another aspect, the present disclosure provides an adjustable support arm assembly having the counterbalance unit connected to the lower arm, and the second end of the elongated flexible element is selectively connected to the upper arm at any one of the plurality of adjustment positions.

In yet another aspect, the present disclosure provides an adjustable support arm assembly having the counterbalance unit connected to the upper arm, the second end of the elongated flexible element is connected to the lower arm, and a bearing element over which the elongated flexible element passes is selectively movable along the upper arm to any one of the plurality of adjustment positions.

It will be understood that no one embodiment of the present invention need include all of the aforementioned aspects of the present invention. Indeed, it is to be understood that both the foregoing general description and the following detailed description are exemplary and provided for purposes of explanation only, and are not restrictive of the subject matter claimed. Further features and objects of the present disclosure will become more fully apparent in the following description of the preferred embodiments and from the appended claims.

BRIEF DESCRIPTION OF THE DRAWINGS

In describing the preferred embodiments, reference is made to the accompanying drawing figures wherein like parts have like reference numerals, and wherein.

Figure 1:
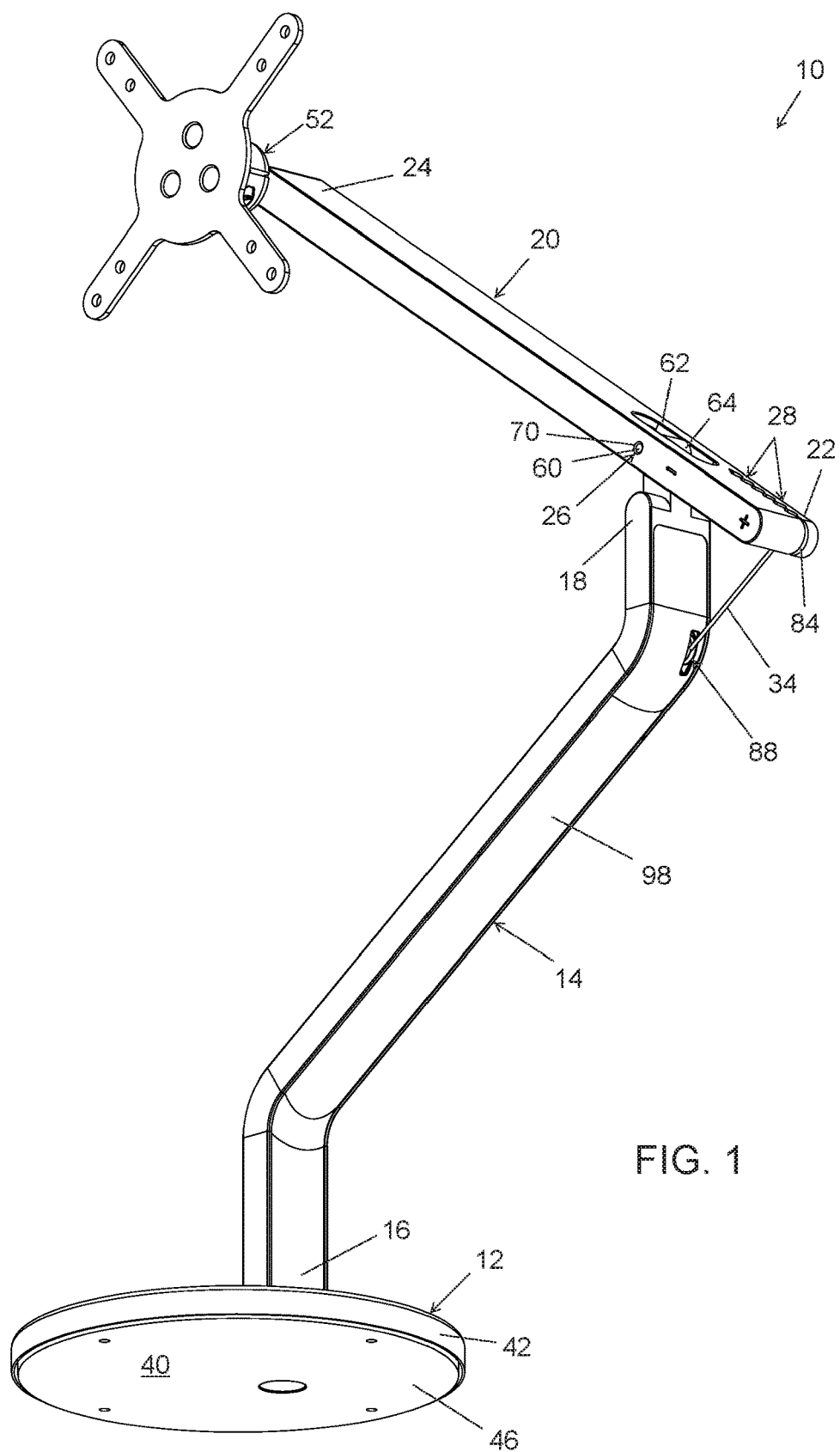
FIG. 1 is a front lower perspective view of a first example adjustable support arm assembly in a first position having a first height.
Figure 2:
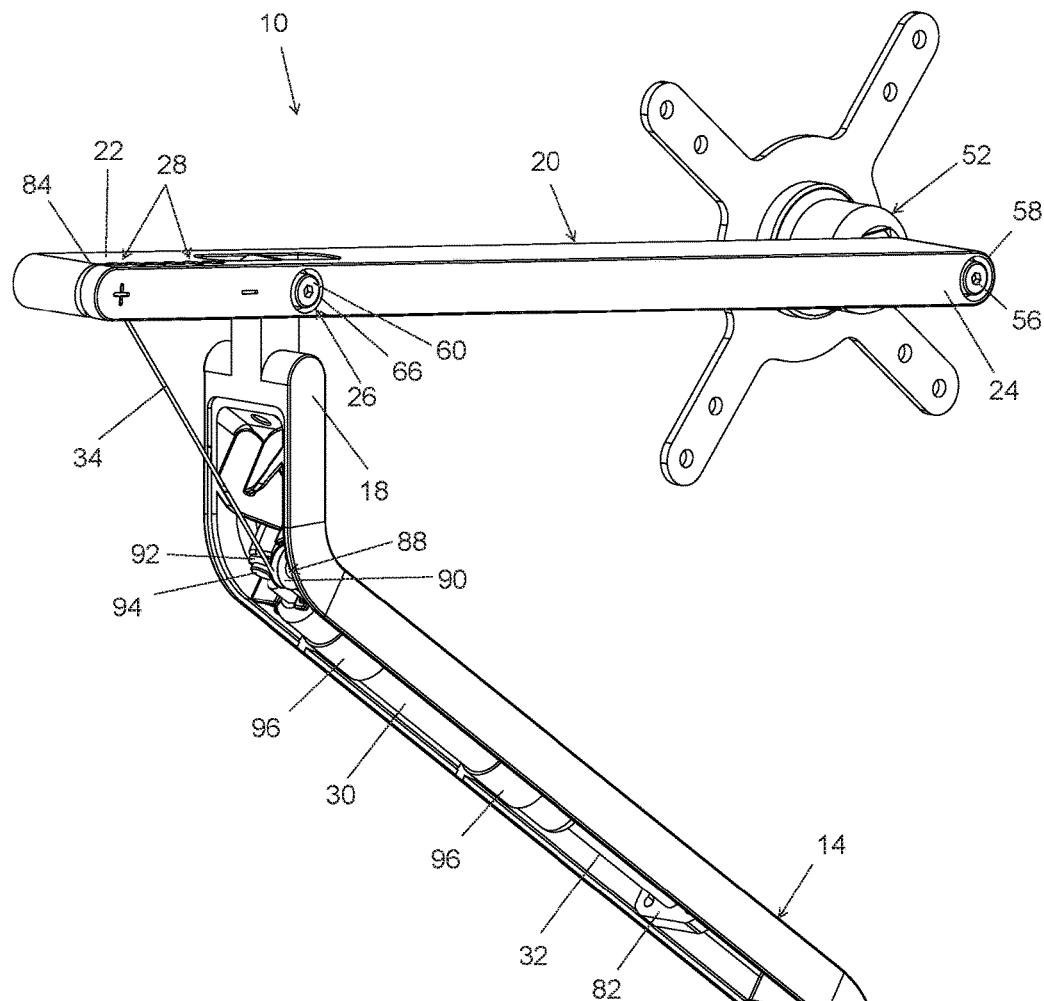
FIG. 2 is a rear perspective view of the first example adjustable support arm assembly of FIG. 1 in a second position having a second height but with the shroud on the underside of the lower arm removed.

It should be understood that the drawings are not to scale. While some mechanical details of example adjustable support arm assemblies, including other plan and section views of the examples shown and of examples that may have alternative configurations have not been included, such details are considered well within the comprehension of those of ordinary skill in the art in light of the present disclosure. It also should be understood that the present invention is not limited to the example embodiments illustrated.

DETAILED DESCRIPTION OF THE PREFERRED EMBODIMENTS

For the following defined terms, these definitions shall be applied, unless a different definition is given in the claims or elsewhere in this disclosure. As used in this disclosure and the claims, the singular forms "a", "an", and "the" include plural referents unless the content clearly dictates otherwise. As used in this disclosure and the claims, the term "or" is generally employed in its sense including "and/or" unless the content clearly dictates otherwise.

Referring generally to FIGS. 1-10, it will be appreciated that adjustable support arm assemblies of the present disclosure generally may be embodied within numerous configurations, and may be used in various ways to enhance the convenience of users. Indeed, while acknowledging that all of the example configurations of adjustable support arm assemblies need not be shown herein, examples are provided to better demonstrate that a variety of configurations and methods of use are contemplated.

Turning to a first example embodiment shown in FIGS. 1-7, it will be appreciated that an adjustable support arm assembly 10 includes a base 12, a lower arm 14 having a first end 16 and an opposed second end 18, wherein the first end 16 of the lower arm 14 is connected to the base 12. An upper arm 20 has a first end 22, an opposed second end 24, and a pivotal connection 26 to the second end 18 of the lower arm 14 disposed between the first and second ends 22, 24 of the upper arm 20. The upper arm 20 also includes a plurality of adjustment positions 28 disposed between the pivotal connection 26 to the second end 18 of the lower arm 14 and the first end 22 of the upper arm 20. The adjustable support arm assembly 10 further includes a counterbalance unit 30 connected to the lower arm 14, which includes a movable portion 32. The adjustable support arm assembly 10 also includes an elongated flexible element 34 having a first end 36 and an opposed second end 38. The first end 36 of the elongated flexible element 34 is connected to the movable portion 32 of the counterbalance unit 30 and the elongated flexible element 34 extends from the lower arm 14 to which the counterbalance unit 30 is connected and the second end 38 of the elongated flexible element 34 is connected to the upper arm 20 to which the counterbalance unit 30 is not connected. Upon review of the second example described below and shown in FIGS. 8-10, it will be appreciated that the counterbalance unit could otherwise be connected to the upper arm and the second end of the elongated flexible element then would be connected to the lower arm.

In the first example adjustable support arm assembly 10, the lower arm 14 is shown as being fixedly connected to the base 12, and the base 12 has a lower surface 40 that does not require a clamping mechanism. The lack of requiring a clamping mechanism enables the adjustable support arm assembly 10 to rest on a support surface, such as the top of a desk, table or the like, with the ability to be repositioned by sliding the base 12 across the support surface, or rotating the base 12 to face the arm toward or away from the user. As may be seen in FIG. 7, the base 12 in the first example includes a housing 42, a first plate 44 and a second plate 46, which are fixedly connected to the first end 16 of the lower arm 14 by a fastener 48 that is received in an aperture 50. The housing 42 may be constructed of any suitable material, such as stamped steel or other metals, or molded plastic or the like. The first and second plates 44, 46 are intended to provide weight and a firm footing for the adjustable support arm assembly 10, so they similarly may be constructed of suitable materials, with the fastener 48 being a screw or other suitable fastener recessed within the second plate 46. It will be appreciated that the base 12 optionally may include feet or pads on the lower surface 40, so as to provide a non-scuffing interface when resting on a support surface. It also will be appreciated that the first end 16 of the lower arm 14 alternatively may be pivotally and/or rotatably connected to the base, so as to be able to tilt, rotate and/or swivel relative to the base 12.

To permit flexibility in positioning of a device on the first example adjustable support arm assembly 10, an accessory mounting head 52 is connected to the second end 24 of the upper arm 20. In this first example, as may be seen in FIG. 7, the accessory mounting head 52 includes a post 54 that receives a fastener 56 that extends through an aperture 58 at the second end 24 of the upper arm 20. The example fastener 56 may be threaded into the post 54 to provide a secure connection. The accessory mounting head 52 of this example is pivotally connected to the second end 24 of the upper arm 20, may permit swiveling or rotation such as from a portrait to landscape format, and is configured with a standard mounting pattern to be connected to a display device (not shown). It will be appreciated that one could configure the second end of the upper arm for direct mounting to a device to be supported by the adjustable support arm assembly 10, or an alternative accessory mounting head may be used that provides other adjustable movement relative to the upper arm 20 or no movement at all, and other suitable means of connection to the upper arm 20 and to a device to be supported.

The pivotal connection 26 of the upper arm 20 to the second end 18 of the lower arm 14 is achieved by a fastener 60. In this first example, as may be seen in FIGS. 1, 2 and 7, the upper arm 20 includes an elongated aperture 62 disposed between the first and second ends 16, 18, but generally being closer to the first end 16. The aperture 62 receives a narrowed section 64 of the second end 18 of the lower arm 14 and the fastener 60 passes through an aperture 66 in the side of the upper arm 20, through an aperture 68 in the narrowed section 64 of the second end 18 of the lower arm 14 and is secured in a smaller aperture 70 through the opposed side of the upper arm 20. In this example, the fastener 60 is secured in place to provide a pivot axis by having a threaded end 72 that is received in the smaller aperture 70. However, it will be appreciated that many other particular structures may be used to pivotally connect the upper arm 20 to the lower arm 14.

Figure 6:
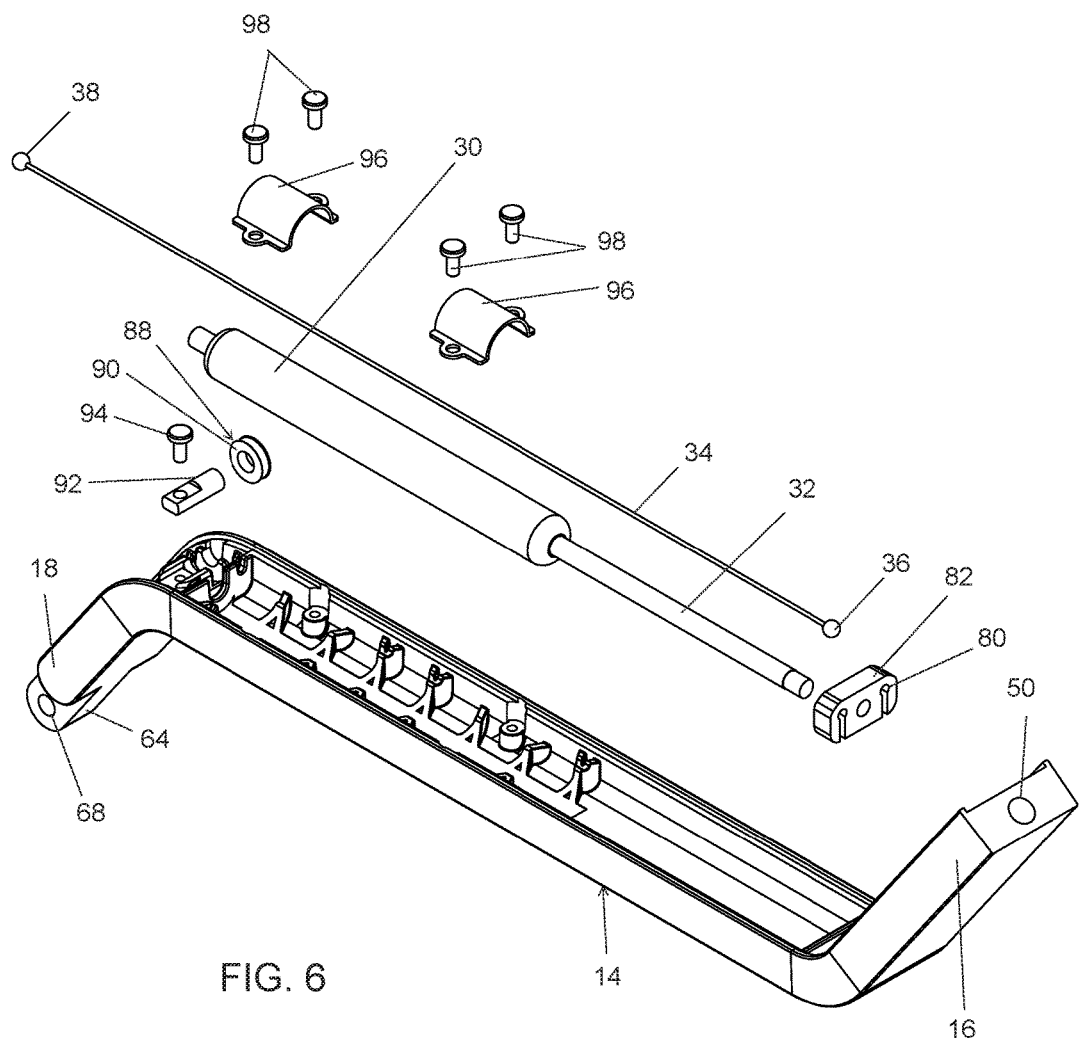
FIG. 6 is an exploded perspective view of the lower arm of the first example adjustable support arm assembly of FIG. 1.
Figure 7:
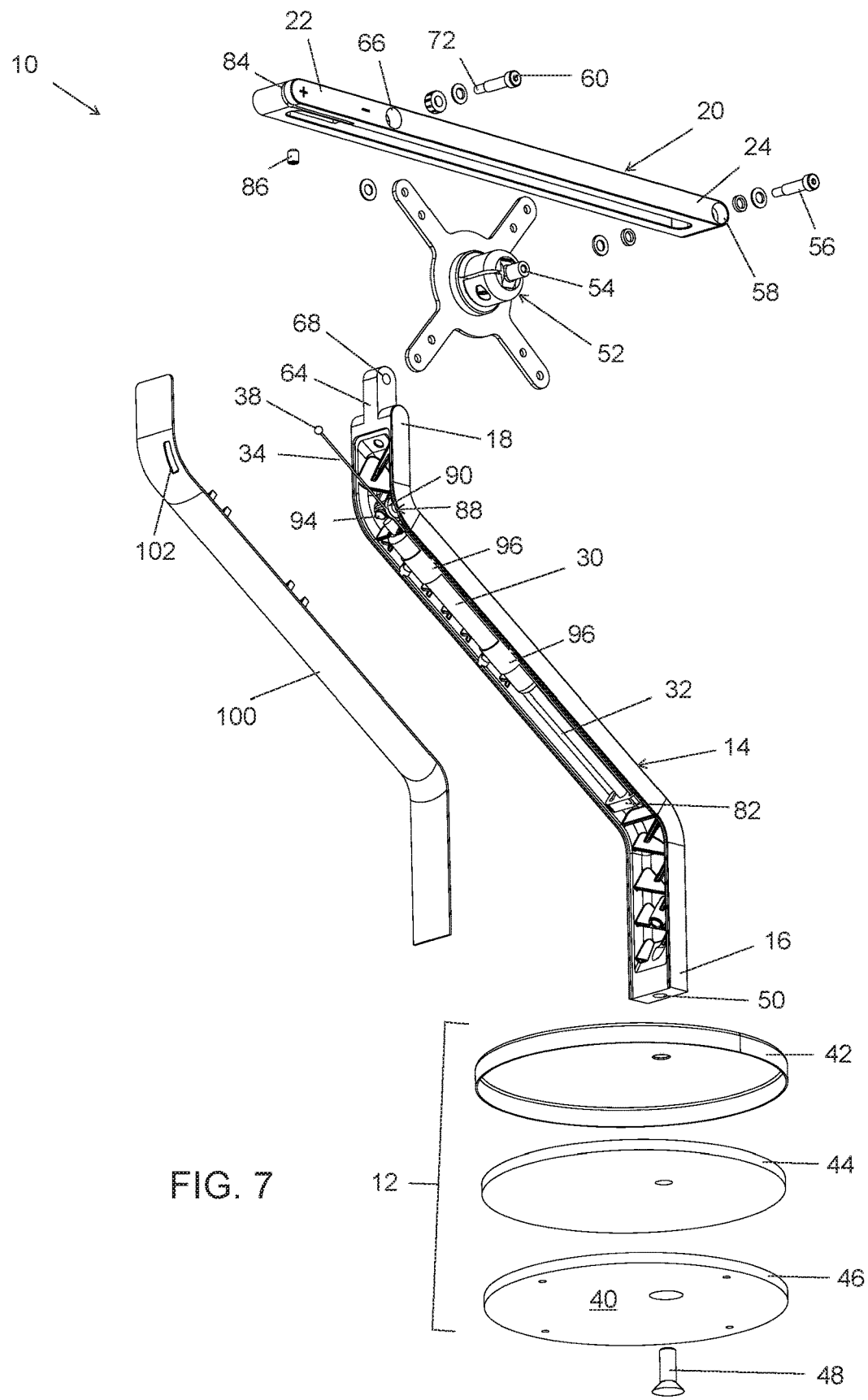
FIG. 7 is a partially exploded rear lower perspective view of the first example adjustable support arm assembly of FIG. 1.

As may be seen in FIGS. 6 and 7, the counterbalance unit 30 in this example is constructed as a gas spring with the movable portion 32 being configured as a piston. In this example, the counterbalance unit 30 is connected to the lower arm 14 with the movable portion or piston 32 being moveable toward and away from the first end 16 of the lower arm 14. The elongated flexible element 34 is shown in this example as a cable having fittings at first and second ends 36, 38. The first end 36 of the elongated flexible element 34 is connected to the movable portion or piston 32 of the counterbalance unit 30 by having the fitting at the first end 36 of the elongated flexible element 34 be received by a receptacle 80 in a clip 82 that fits on the end of the piston 32. It will be appreciated that other structures and configurations may be utilized in connecting the first end 36 of the elongated flexible element 34 to the movable portion 32 of the counterbalance unit 30. It also will be appreciated that the elongated flexible element could be constructed in a manner other than as a cable, such as in the form of a plastic band, woven cord or other suitable configuration.

A counterbalance force exerted by the counterbalance unit 30 on the upper arm 20 is selectively adjustable relative to the plurality of adjustment positions 28 disposed between the pivotal connection 26 of the upper arm 20 to the second end 18 of the lower arm 14 and the first end 22 of the upper arm 20. The plurality of adjustment positions 28 in the upper arm 20 may be seen in FIGS. 1-4 and include a plurality of receptacles spaced along the first end 22 of the upper arm 20. The second end 38 of the elongated flexible element 34 has a fitting that is releasably received by any of the plurality of receptacles that serve as the plurality of adjustment positions 28 in the upper arm 20.

Figure 4:
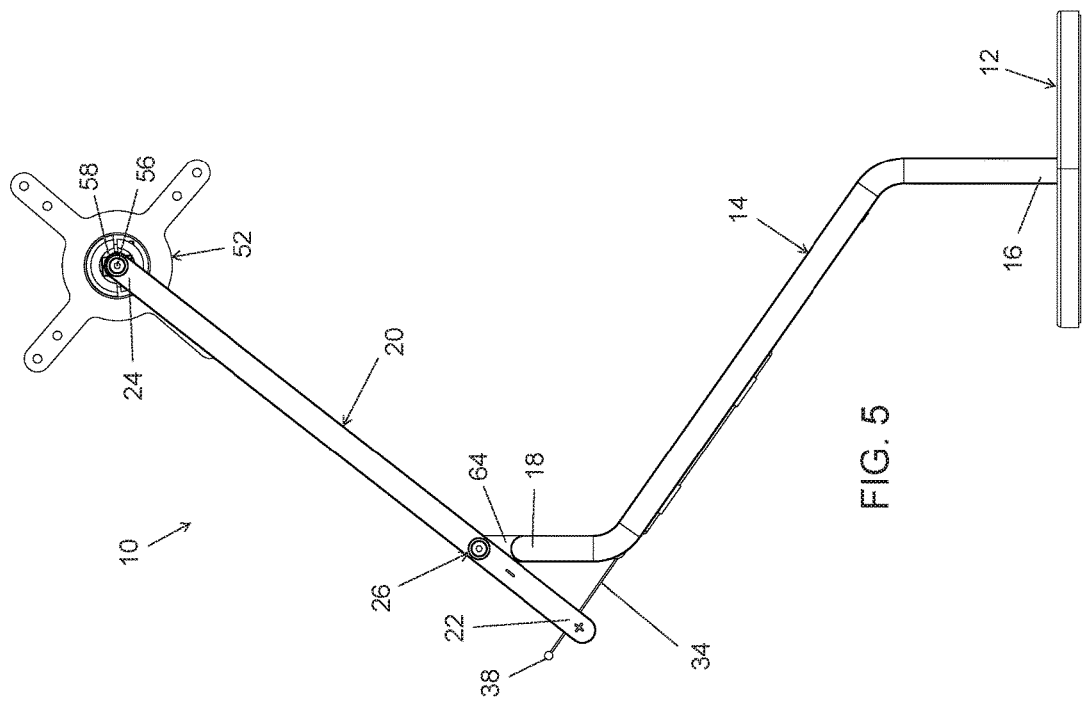
FIG. 4 is rear perspective view of the first example adjustable support arm assembly of FIG. 1 in a third position having a third height and which permits counterbalance adjustment.
Figure 5:
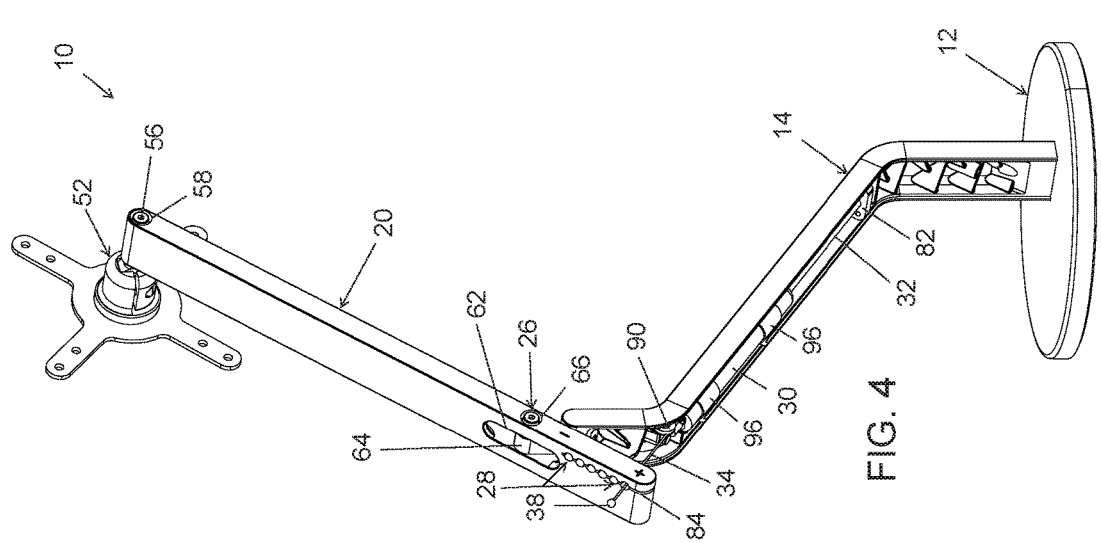
FIG. 5 is rear plan view of the first example adjustable support arm assembly of FIG. 1 in the third position shown in FIG. 4.

The selective adjustment of the counterbalance force is made without tools. As shown in FIGS. 4 and 5, the second end 24 of the upper arm 20 may be manually raised by the user beyond a position required to place the elongated flexible element 34 in tension, this will cause the second end 38 of the elongated flexible member to extend outward from the first end 22 of the upper arm 20. The second end 38 of the elongated flexible element 34 may be grasped and manually guided into alignment with a different one of the receptacles of the plurality of adjustment positions 28, which alters the mechanical advantage applied relative to the axis through the pivotal connection 26 between the lower arm 14 and upper arm 20. Thus, the counterbalance of the upper arm 20 is adjusted by moving the second end 38 of the elongated flexible element 34 from one to another of the plurality of receptacles that define the plurality of adjustment positions 28 in the upper arm 20. This may be recognized when comparing FIGS. 1 and 2, with the elongated flexible element 34 in a first of the plurality of adjustment positions 28 but with the upper arm 20 shown at two different angular positions, to FIG. 3, with the elongated flexible element 34 in a different one of the plurality of adjustment positions 28 in the upper arm 20. This difference in positioning of the second end of the elongated flexible element 34 will cause a difference in travel of the movable portion 32 of the counterbalance unit 30, so as to provide a different counterbalance force.

As may be seen in FIGS. 1-4 and 7, it will be appreciated that the plurality of receptacles that define the plurality of adjustment positions 28 are connected by an open channel 84 that extends to the first end 22 of the upper arm 20, which permits the initial entry of the elongated flexible element 34. A set screw 86, seen in FIG. 7, may be inserted to block removal of the second end 38 of the elongated flexible element 34 from the channel 84 and plurality of adjustment positions 28. It will be appreciated that the plurality of adjustment positions may be defined by structure other than receptacles, and access to accept the elongated flexible element 34 alternatively may be by way of a channel through a side of the upper arm 20, or from the elongated aperture 62 to the plurality of receptacles that provide the plurality of adjustment positions 28. Indeed, the plurality of adjustment positions may be defined by structure other than receptacles, such as movement along a threaded screw or other suitable structure, which would result in an alternative structure and way of adjusting the relative counterbalance force.

To help provide smooth movement of the movable portion 32 of the counterbalance unit 30, a bearing element 88 is located proximate the second end 18 of the lower arm 14 and the bearing element 88 is engaged by the elongated flexible element 34. In this example, as may be seen in FIGS. 2, 3, 6 and 7, the bearing element 88 is constructed as a rotatable guide wheel 90 that is engaged by the elongated flexible element 34 for reduced friction. The guide wheel 90 may be constructed of various materials, such as glass-filled nylon, metals or other plastics. The guide wheel 90 rotates on an axle or pin 92 that is secured to the lower arm 14 by a fastener 94, such as a screw or other suitable fastener for connecting an axle or pin to the lower arm 14. The axle or pin 92 may be constructed of steel or other metals, or other suitable rigid materials. It will be appreciated that the bearing element may be provided by an alternative rotating member, or alternatively may be provided by a fixed element that provides a bearing surface engaged by the elongated flexible member as it slides over such a fixed bearing element.

Figure 3:
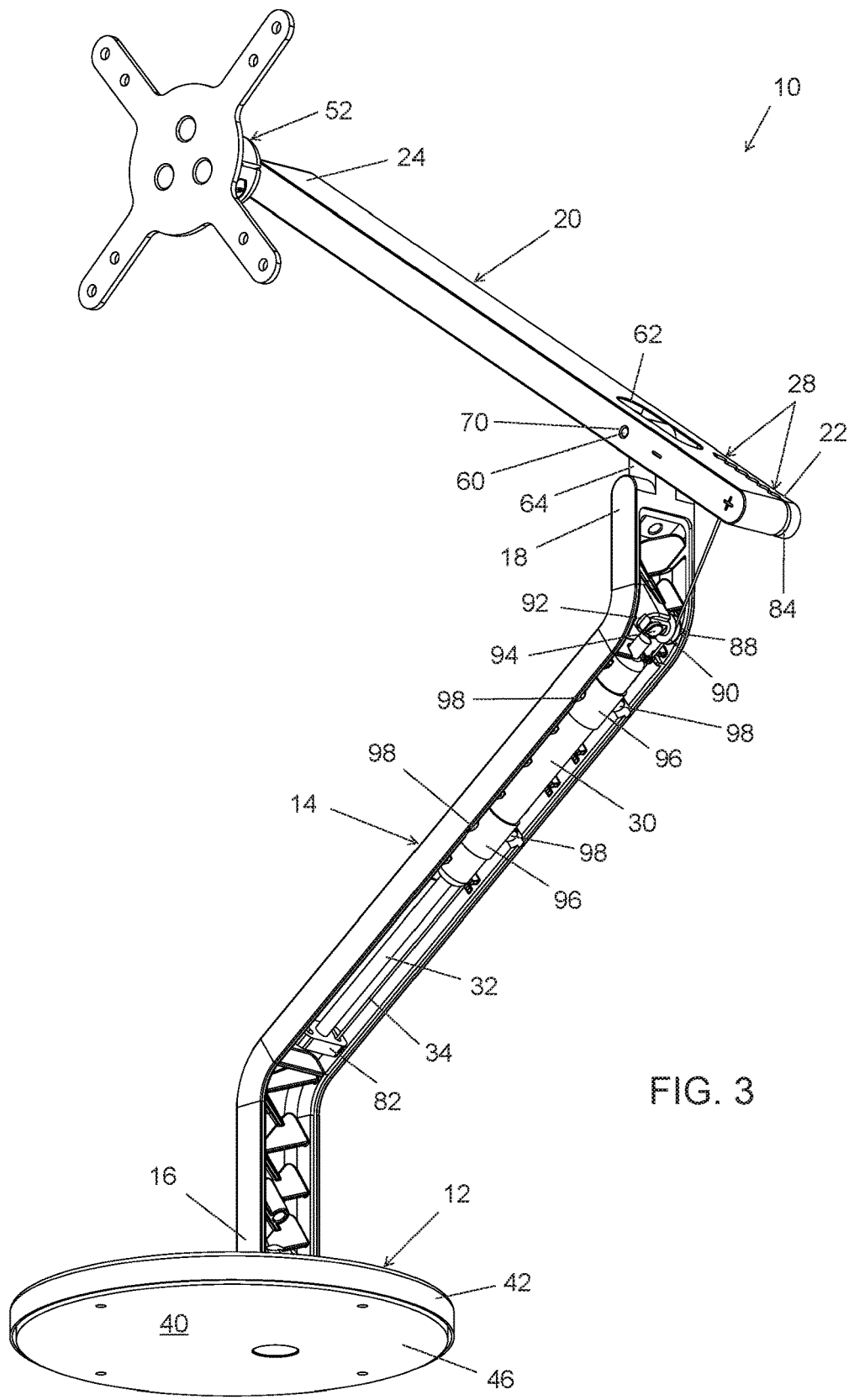
FIG. 3 is a front lower perspective view of the first example adjustable support arm assembly of FIG. 1 but with a shroud removed from the lower arm.

As may be seen in FIGS. 3 and 6, to securely hold the counterbalance unit 30 in place within the lower arm 14, two brackets 96 are provided that clamp the counterbalance unit 30 in place upon installation of fasteners 98, such as screws that may engage apertures in the lower arm 14. It will be appreciated that the counterbalance unit 30 may be connected to the lower arm 14 in a suitable alternative way, such as by one bracket, snap fit or other means of connection. In addition, it will be appreciated that the counterbalance unit may have a different construction that provides a counterbalance force, such as a spring or other suitable structure.

As may be seen in FIGS. 1 and 7, to conceal and protect its contents, the lower arm 14 may include a shroud 100 that may be configured to snap into place along the underside of the lower arm 14, or be connected in an alternative way, whether by use of fasteners that are integrated into the shroud 100 or lower arm 14, or are supplied as separate pieces that connect a shroud to the lower arm. The shroud 100 also may include an aperture 102 or notch that permits the elongated flexible element 34 to extend outward from the lower arm 14. In this example, the lower arm 14 may be constructed of cast aluminum or other metal, molded plastic or the like. The upper arm 20 and shroud 100 may be constructed of the same material as that of the lower arm 14, or a different material from the lower arm 14, but suitable for the purpose, such as the lower arm 14 being cast aluminum, while the upper arm is cast aluminum or plastic and the shroud is plastic.

Figure 8:
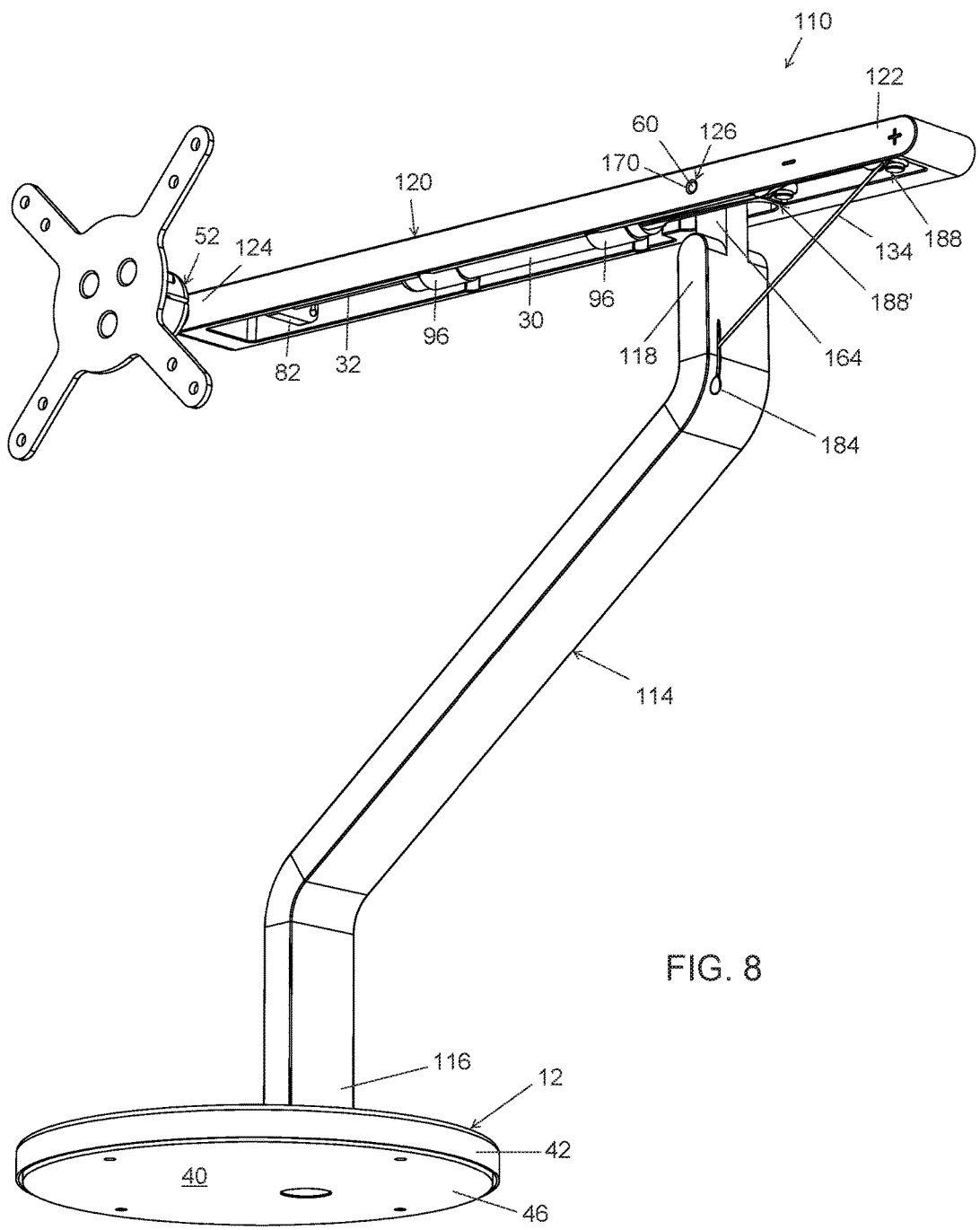
FIG. 8 is a front lower perspective view of a second example adjustable support arm assembly in a first position having a first height.
Figure 9:
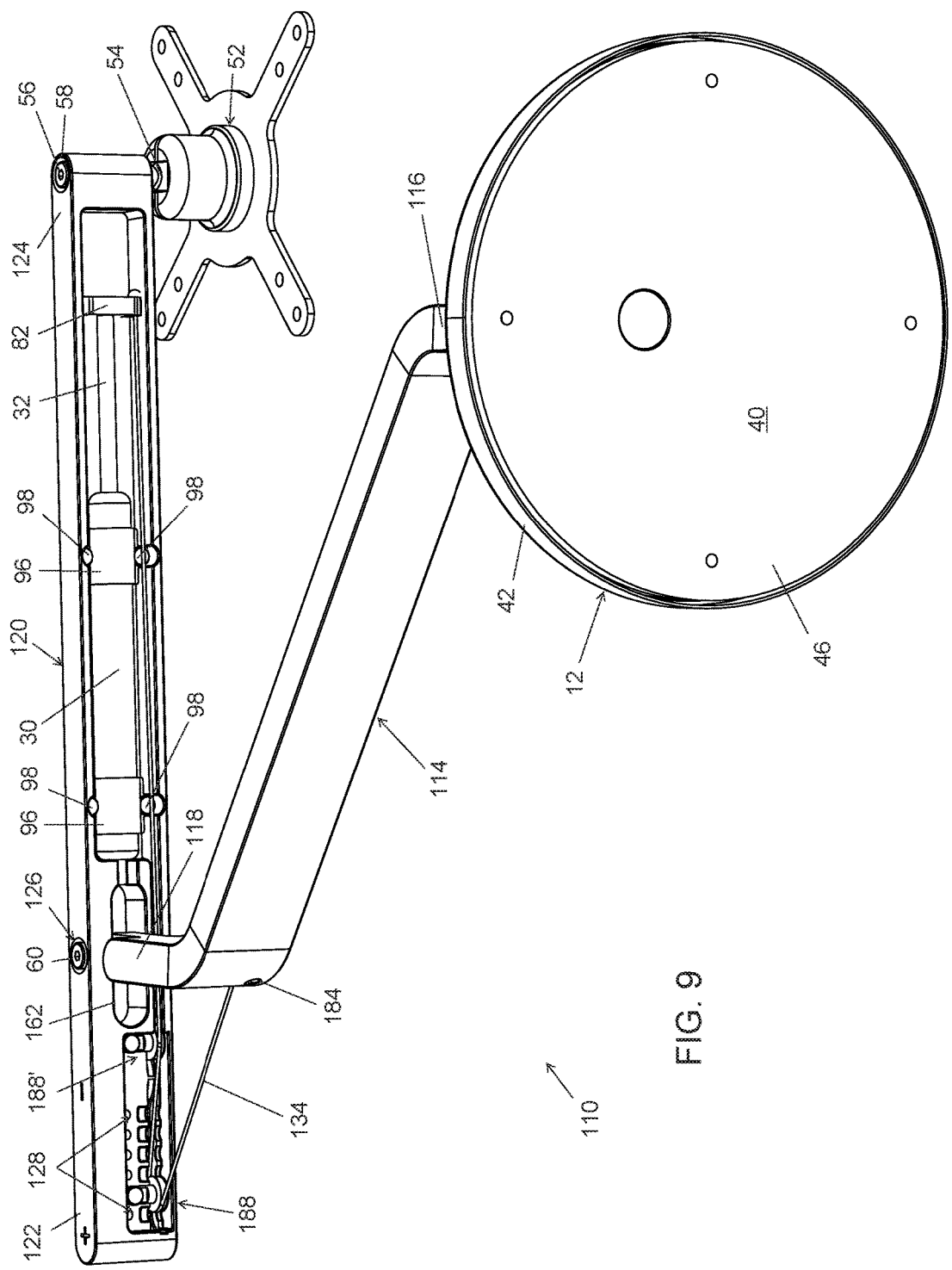
FIG. 9 is a rear lower perspective view of the second example adjustable support arm assembly of FIG. 8 in the first position.
Figure 10:
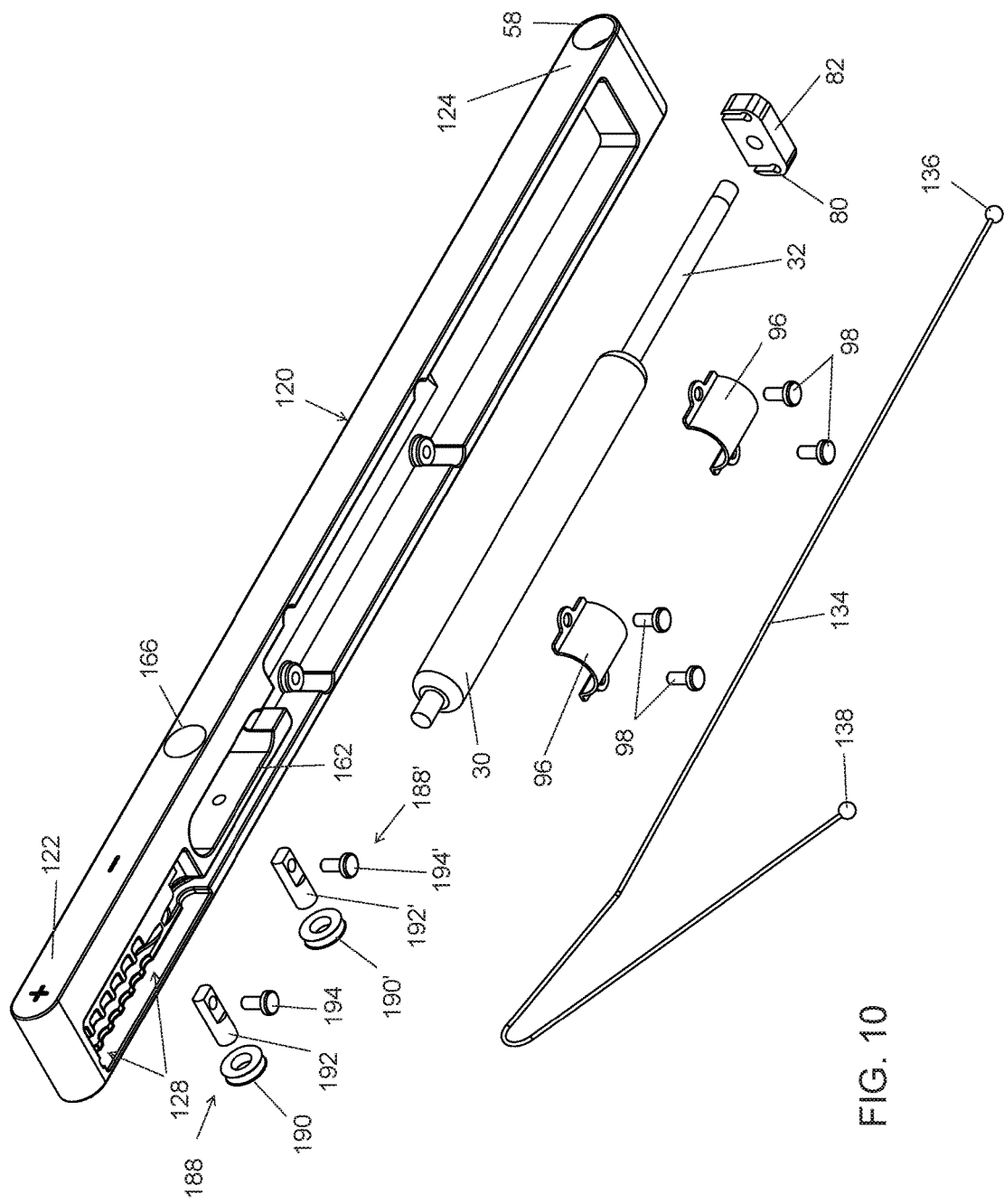
FIG. 10 is an exploded perspective view of the upper arm of the second example adjustable support arm assembly of FIG. 8.

Now turning to a second example embodiment shown in FIGS. 8-10, it will be appreciated that several components from the first example also are used in the second example, and therefore, the same reference numerals will be used for those components. An adjustable support arm assembly 110 is shown including a base 12, a lower arm 114 having a first end 116 and an opposed second end 118, wherein the first end 116 of the lower arm 114 is connected to the base 12. An upper arm 120 has a first end 122, an opposed second end 124, and a pivotal connection 126 to the second end 118 of the lower arm 114 disposed between the first and second ends 122, 124 of the upper arm 120. The upper arm 120 also includes a plurality of adjustment positions 128 disposed between the pivotal connection 126 to the second end 118 of the lower arm 114 and the first end 122 of the upper arm 120. The adjustable support arm assembly 110 further includes a counterbalance unit 30 connected to the upper arm 120, which includes a movable portion 32. The adjustable support arm assembly 110 also includes an elongated flexible element 134 having a first end 136 and an opposed second end 138. The first end 136 of the elongated flexible element 134 is connected to the movable portion 32 of the counterbalance unit 30 and the elongated flexible element 134 extends from the upper arm 120 to which the counterbalance unit 30 is connected and the second end 138 of the elongated flexible element 134 is connected to the lower arm 114 to which the counterbalance unit 30 is not connected.

The second example adjustable support arm assembly 110 utilizes the components for the base 12 and connection to the lower arm 114 as were shown and described in greater detail with respect to the first example adjustable support arm assembly 10. Thus, the lower arm 114 is fixedly connected to the base 12, and the base 12 has a lower surface 40 that does not require a clamping mechanism. The advantages with respect to repositioning were discussed with respect to the first example 10 and apply equally to the second example adjustable support arm assembly 110. As noted previously, it will be appreciated that the base 12 optionally may include feet or pads on the lower surface 40, so as to provide a non-scuffing interface when resting on a support surface. Also, as with the first example, it will be appreciated that the first end 116 of the lower arm 114 alternatively may be pivotally and/or rotatably connected to the base, so as to be able to tilt, rotate and/or swivel relative to the base 12.

To permit flexibility in positioning of a device on the second example adjustable support arm assembly 110, an accessory mounting head 52 is connected to the second end 124 of the upper arm 120. The structure of the accessory mounting head 52 and its connection to the upper arm 120 of the second example adjustable support arm assembly 110 is the same as was described and shown for the first example adjustable support arm assembly 10. Thus, a post 54 receives a fastener 56 that extends through an aperture 58 at the second end 124 of the upper arm 120. The potential adjustable movement and alternative structures for an accessory mounting head described with respect to the first example 10 also apply to the second example adjustable support arm assembly 110.

For the second example adjustable support arm assembly 110, the pivotal connection 126 of the upper arm 120 to the second end 118 of the lower arm 114 is achieved by a fastener 60, similarly to the connection in the first example adjustable support arm assembly 10. As may be seen in FIGS. 8 and 9, the upper arm 120 includes an elongated aperture 162 disposed between the first and second ends 122, 124 of the upper arm 120, but generally being closer to the first end 122. The aperture 162 receives a narrowed section 164 of the second end 118 of the lower arm 114 and the same fastener 60 as is used in the first example 10 similarly passes through an aperture 166 in the side of the upper arm 120, through an aperture in the narrowed section 164 of the second end 118 of the lower arm 114, and is secured in a smaller aperture 170 through the opposed side of the upper arm 120. For the second example 110, the fastener 60 is secured in place to provide a pivot axis by having a threaded end that is received in the smaller aperture 170. However, it will be appreciated that many other particular structures may be used to pivotally connect the upper arm 120 to the lower arm 114.

As may be seen in FIGS. 8-10, the counterbalance unit 30 in the second example adjustable support arm assembly 110 also is constructed as a gas spring with the movable portion 32 being configured as a piston. In this example, the counterbalance unit 30 is connected to the upper arm 120 with the movable portion or piston 32 being moveable toward and away from the second end 124 of the upper arm 120. The elongated flexible element 134 is shown in the second example 110 as a cable having fittings at first and second ends 136, 138. The first end 136 of the elongated flexible element 134 is connected to the movable portion or piston 32 of the counterbalance unit 30 by having the fitting at the first end 136 of the elongated flexible element 134 be received by a receptacle 80 in a clip 82 that fits on the end of the piston 32. As noted with the first example, it will be appreciated that other structures and configurations may be utilized in connecting the first end 136 of the elongated flexible element 134 to the movable portion 32 of the counterbalance unit 30, and that the elongated flexible element could be constructed in other suitable configurations.

A counterbalance force exerted by the counterbalance unit 30 on the upper arm 120 is selectively adjustable relative to the plurality of adjustment positions 128 disposed between the pivotal connection 126 of the upper arm 120 to the second end 118 of the lower arm 114 and the first end 122 of the upper arm 120. The plurality of adjustment positions 128 in the upper arm 120 may be seen in FIGS. 9 and 10 and include a plurality of receptacles that provide seats for a bearing element 188 and serve as the plurality of adjustment positions 128 along the first end 122 of the upper arm 120. The second end 138 of the elongated flexible element 134 has a fitting that is releasably received by a recess 184 near the second end 118 of the lower arm 114. The second example adjustable support arm assembly 110 also includes a second bearing element 188' that helps provide smooth movement by guiding the elongated flexible element 134 to the first bearing element 188.

The selective adjustment of the counterbalance force for the second example adjustable support arm assembly 110 requires movement of the bearing element 188 among the plurality of adjustment positions 128. Similarly to the first example 10, the second end 124 of the upper arm 120 of the second example adjustable support arm assembly 110 may be manually raised by the user beyond a position required to place the elongated flexible element 134 in tension. This will cause the second end 138 of the elongated flexible element 134 to extend outward from the receptacle 184 near the second end 118 of the lower arm 114. The bearing element 188 then may be moved to a different one of the receptacles of the plurality of adjustment positions 128, which alters the mechanical advantage applied relative to the axis through the pivotal connection 126 between the lower arm 114 and upper arm 120. The second end 138 of the elongated flexible element 134 then may be guided into the receptacle 184 in the lower arm 114 as the upper arm 120 is lowered to place the elongated flexible element 134 in tension.

Thus, the counterbalance of the upper arm 120 is adjusted by moving the bearing element 188 from one to another of the plurality of receptacles that define the plurality of adjustment positions 128 in the upper arm 120. The difference in positioning of the bearing element 188 will cause a difference in travel of the movable portion 32 of the counterbalance unit 30, so as to provide a different counterbalance force. It will be appreciated that the plurality of adjustment positions may be defined by structure other than receptacles, which would result in an alternative structure and way of adjusting the relative counterbalance force.

To help provide smooth movement of the movable portion 32 of the counterbalance unit 30, the bearing element 188 is located proximate the first end 122 of the upper arm 120 and the bearing element 188 is engaged by the elongated flexible element 134. In the second example 110, as may be seen in FIG. 10, the bearing element 188 is constructed as a rotatable guide wheel 190 that is engaged by the elongated flexible element 134 for reduced friction. The guide wheel 190 may be constructed of various materials, such as glass-filled nylon, metals or other plastics. The guide wheel 190 rotates on an axle or pin 192 that is secured to the upper arm 120 by a fastener 194, such as a screw or other suitable fastener for connecting an axle or pin to the upper arm 120. The axle or pin 192 may be constructed of steel or other metals, or other suitable rigid materials. The fastener 194 is shown in simplified form, but if the fastener 194 is a screw that includes gripping surfaces, such as in the form of a wing screw, then adjustment of the counterbalance force by moving the bearing element 188 may be made without tools. Alternatively, if the fastener 194 is a more customary screw, then at least a screwdriver would be needed to adjust the counterbalance force by selecting a different one of the plurality of adjustment positions 128 for the bearing element 188. It also will be appreciated that the bearing element may be provided by an alternative rotating member, or alternatively may be provided by a fixed element that provides a bearing surface engaged by the elongated flexible member as it slides over the fixed bearing element.

To help guide the elongated flexible element 134 to the bearing element 188, the second example adjustable support arm assembly 110 further includes a second bearing element 188' disposed between the first end 122 and the elongated aperture 162 of the upper arm 120. As may be seen in FIG. 10, the second bearing element 188' is constructed as a rotatable guide wheel 190' that is engaged by the elongated flexible element 134 for reduced friction. The guide wheel 190' may be constructed of any of the previously mentioned materials relating to the first bearing element 188. The guide wheel 190' rotates on an axle or pin 192' that is secured to the upper arm 120 by a fastener 194', such as a screw or other suitable fastener for connecting an axle or pin to the upper arm 120. The axle or pin 192' may be constructed of steel or other metals, or other suitable rigid materials. It will be appreciated that the second bearing element need not be moved or adjusted and may be provided by an alternative rotating member, or alternatively may be provided by a fixed element that provides a bearing surface engaged by the elongated flexible member as it slides over such a fixed second bearing element.

As may be seen in FIGS. 9-10, to securely hold the counterbalance unit 30 in place within the upper arm 120, two brackets 96 are provided that clamp the counterbalance unit 30 in place upon installation of fasteners 98, such as screws that may engage apertures in the upper arm 120. Similarly to the first example 10, it will be appreciated that the counterbalance unit 30 may be connected to the upper arm 120 in a suitable alternative way, such as by one bracket, snap fit or other means of connection. In addition, it will be appreciated that the counterbalance unit may have a different construction that provides a counterbalance force, such as a spring or other suitable structure. The two example adjustable support arm assemblies 10, 110 demonstrate that the counterbalance unit may be connected to either a lower or an upper arm of an assembly having both a lower and an upper arm.

The second example adjustable support arm assembly 110 is shown in a configuration that does not include a shroud on the underside of the upper arm 120 to conceal and protect its contents. Alternatively, the upper arm 120 may include a shroud in a manner similar to the shroud on the lower arm in the first example adjustable support arm assembly 10. Such a shroud may be configured to snap into place along the underside of the upper arm 120, or be connected in an alternative way, whether by use of fasteners that are integrated into the shroud or upper arm 120, or are supplied as separate pieces that connect a shroud to the upper arm. The shroud also may include an aperture, notch or removable portion that permits access to the bearing element to be moved for adjustment of the counterbalance force. In this example, the lower arm 114 may be constructed of cast aluminum or other metal, molded plastic or the like. The upper arm 120 may be constructed of the same material as that of the lower arm 114, or a different material from the lower arm 114, but suitable for the purpose, such as the lower arm 114 being cast aluminum, while the upper arm is plastic.

From the above disclosure, it will be appreciated that adjustable support arm assemblies may be constructed in accordance with the present disclosure and may be provided in various configurations. Any variety of suitable materials of construction, configurations, shapes and sizes for the components and methods of connecting the components may be utilized to meet the particular needs and requirements of an end user. It will be apparent to those skilled in the art that various modifications can be made in the design and construction of such adjustable support arm assemblies, as well as in the method of adjusting the counterbalance provided within the assembly, without departing from the scope or spirit of the claimed subject matter, and that the claims are not limited to the preferred embodiments and methods illustrated herein. The example adjustable support arm assemblies shown herein may exhibit one or more of the above-referenced potential advantages, depending upon the specific design chosen. It also will be appreciated that the example embodiments may be shown in simplified form, so as to focus on the key components and to avoid including structures that are not necessary to the disclosure and that would complicate the drawings. For instance, fasteners are not shown with threads, as one would appreciate such details that are not necessary to the description of the inventive subject matter.

The invention claimed is:

1. An adjustable support arm assembly comprising:
   a base having a lower surface configured to rest on a support surface;
   a lower arm having a first end and an opposed second end, wherein the first end of the lower arm is connected to the base, and the lower arm extends upward from the first end to the second end;
   an upper arm of fixed length having a first end, an opposed second end, a pivotal connection to the second end of the lower arm disposed between the first and second ends of the upper arm, and a plurality of adjustment positions disposed between the pivotal connection to the second end of the lower arm and the first end of the upper arm;
   a counterbalance unit connected to and concealed by the lower arm or the upper arm and including a movable portion;
   an elongated flexible element having a first end and an opposed second end; and
   wherein the first end of the elongated flexible element is connected to the movable portion of the counterbalance unit and the elongated flexible element extends from the lower or upper arm to which the counterbalance unit is connected and the second end of the elongated flexible element is connected to the other of the lower or upper arm to which the counterbalance unit is not connected.

2. The adjustable support arm assembly of claim 1, wherein the counterbalance unit is connected to the lower arm, and the second end of the elongated flexible element is selectively connected to the upper arm at any one of the plurality of adjustment positions.

3. The adjustable support arm assembly of claim 1, wherein the counterbalance unit is connected to the upper arm, the second end of the elongated flexible element is connected to the lower arm, and a bearing element over which the elongated flexible element passes is selectively movable along the upper arm to any one of the plurality of adjustment positions.

4. The adjustable support arm assembly of claim 1, further comprising the lower arm being fixedly connected to the base.

5. The adjustable support arm assembly of claim 1, wherein the base further comprises a lower surface that does not require a clamping mechanism.

6. The adjustable support arm assembly of claim 1, further comprising an accessory mounting head connected to the second end of the upper arm.

7. The adjustable support arm assembly of claim 6, wherein the accessory mounting head is pivotally connected to the second end of the upper arm.

8. The adjustable support arm assembly of claim 6, wherein the accessory mounting head is configured to be mounted to a display device.

9. The adjustable support arm assembly of claim 1, wherein a counterbalance force exerted on the upper arm is selectively adjustable relative to the plurality of adjustment positions disposed between the pivotal connection of the upper arm to the second end of the lower arm and the first end of the upper arm.

10. The adjustable support arm assembly of claim 9, wherein the selective adjustment of the counterbalance force is made without tools.

11. The adjustable support arm assembly of claim 1, wherein the counterbalance unit further comprises a gas spring with a movable piston.

12. The adjustable support arm assembly of claim 11, wherein the counterbalance unit is connected to the lower arm with the movable piston being moveable toward and away from the first end of the lower arm.

13. The adjustable support arm assembly of claim 12, wherein the first end of the elongated flexible element is connected to the movable piston of the counterbalance unit.

14. The adjustable support arm assembly of claim 11, wherein the counterbalance unit is connected to the upper arm with the movable piston being moveable toward and away from the second end of the upper arm.

15. The adjustable support arm assembly of claim 14, wherein the first end of the elongated flexible element is connected to the movable piston of the counterbalance unit.

16. The adjustable support arm assembly of claim 1, wherein the elongated flexible element further comprises a cable.

17. The adjustable support arm assembly of claim 1, wherein each of the first and second ends of the elongated flexible element further comprises a fitting.

18. The adjustable support arm assembly of claim 1, wherein the plurality of adjustment positions in the upper arm further comprises a plurality of receptacles.

19. The adjustable support arm assembly of claim 18, wherein the second end of the elongated flexible element further comprises a fitting and the fitting is releasably received by any of the plurality of receptacles in the upper arm.

20. The adjustable support arm assembly of claim 19, wherein counterbalance of the upper arm is adjusted by moving the second end of the elongated flexible element from one to another of the plurality of receptacles in the upper arm.

21. The adjustable support arm assembly of claim 19, wherein the plurality of receptacles are connected by an open channel that extends to the first end of the upper arm.

22. The adjustable support arm assembly of claim 18, wherein a bearing element over which the elongated flexible element passes is selectively movable along the upper arm and is releasably received by any one of the plurality of receptacles in the upper arm.

23. The adjustable support arm assembly of claim 22, wherein counterbalance of the upper arm is adjusted by moving the bearing element over which the elongated flexible element passes from one to another of the plurality of receptacles in the upper arm.

24. The adjustable support arm assembly of claim 1, further comprising a bearing element proximate the second end of the lower arm and which is engaged by the elongated flexible element.

25. The adjustable support arm assembly of claim 24, wherein the bearing element further comprises a rotatable guide wheel that is engaged by the elongated flexible element.

26. The adjustable support arm assembly of claim 1, wherein the lower arm further comprises a shroud that conceals the counterbalance unit.

27. The adjustable support arm assembly of claim 1, wherein the upper arm further comprises an opening that receives the second end of the lower arm.

* * * * *